United States Patent
Aoun et al.

(10) Patent No.: US 9,259,993 B2
(45) Date of Patent: Feb. 16, 2016

(54) HEATING, VENTILATION AND/OR AIR CONDITIONING LOOP AND HEATING, VENTILATION AND/OR AIR CONDITIONING EQUIPMENT INCLUDING SUCH HEATING, VENTILATION AND/OR AIR CONDITIONING LOOP

(75) Inventors: Bernard Aoun, Paris (FR); Régis Beauvis, Les Bréviaires (FR); Muriel Porto, Villepreux (FR); Maurizio Alessio, Le Mesnil Saint Denis (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 534 days.

(21) Appl. No.: 13/636,860

(22) PCT Filed: Mar. 21, 2011

(86) PCT No.: PCT/EP2011/054275
§ 371 (c)(1),
(2), (4) Date: Jan. 29, 2013

(87) PCT Pub. No.: WO2011/117207
PCT Pub. Date: Sep. 29, 2011

(65) Prior Publication Data
US 2013/0118200 A1 May 16, 2013

(30) Foreign Application Priority Data
Mar. 24, 2010 (FR) ..................................... 10 01171
Sep. 1, 2010 (FR) ..................................... 10 03493

(51) Int. Cl.
*F25B 13/00* (2006.01)
*B60H 1/32* (2006.01)
(Continued)

(52) U.S. Cl.
CPC .......... *B60H 1/3213* (2013.01); *B60H 1/00071* (2013.01); *B60H 1/00921* (2013.01);
(Continued)

(58) Field of Classification Search
CPC ................................. F25B 41/06; F25B 39/04
USPC .............................. 62/324.5, 324.6, 506, 527
See application file for complete search history.

(56) References Cited

U.S. PATENT DOCUMENTS

| 6,314,750 B1 | 11/2001 | Ishikawa et al. |
| 2002/0007943 A1 | 1/2002 | Ozaki et al. |

(Continued)

FOREIGN PATENT DOCUMENTS

| EP | 1262347 A2 | 12/2002 |
| EP | 1533154 A1 | 5/2005 |

OTHER PUBLICATIONS

English language abstract and machine-assisted English Translation for EP 1262347 extracted from the espacenet.com database on Dec. 18, 2012, 40 pages.

(Continued)

*Primary Examiner* — Melvin Jones
(74) *Attorney, Agent, or Firm* — Howard & Howard Attorneys PLLC

(57) ABSTRACT

The invention relates to a heating, ventilation and/or air conditioning loop (8) inside of which flows a coolant, and including a compressor (9), an outer heat exchanger (15), a restitution heat exchanger (12, 32) and a first expansion member (17) provided downstream from the restitution heat exchanger (12, 32) in the flow direction (11) of the coolant in the heating, ventilation and/or air conditioning loop (8). The heating, ventilation and/or air conditioning loop (8) includes means (20) for bypassing the inner heat exchanger (12) and the first expansion member (17). The present invention also relates to a heating, ventilation and/or air conditioning equipment (1) including such a heating, ventilation and/or air conditioning loop (8).

17 Claims, 6 Drawing Sheets

Figure 1:
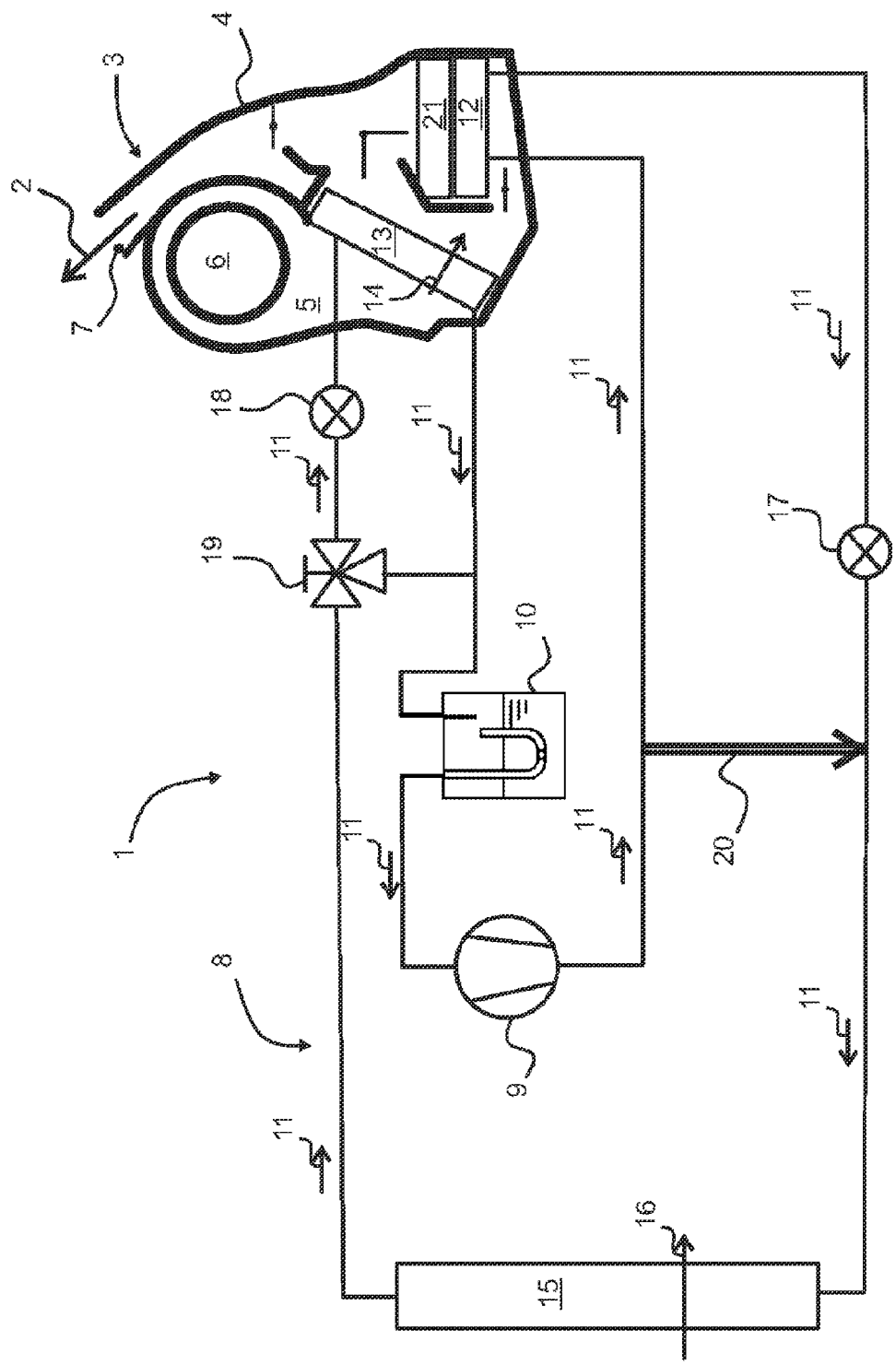

(51) Int. Cl.
  *B60H 1/00* (2006.01)
  *F25B 41/00* (2006.01)
  *F25B 41/04* (2006.01)
  *F25B 49/02* (2006.01)
  *B60H 1/22* (2006.01)
  *F25D 21/12* (2006.01)

(52) U.S. Cl.
  CPC ............... *B60H 1/22* (2013.01); *F25B 41/00* (2013.01); *F25B 41/04* (2013.01); *F25B 49/02* (2013.01); *F25B 2339/047* (2013.01); *F25B 2341/0662* (2013.01); *F25B 2400/01* (2013.01); *F25B 2400/0403* (2013.01); *F25B 2400/0409* (2013.01); *F25B 2400/0411* (2013.01); *F25D 21/125* (2013.01)

(56) References Cited

U.S. PATENT DOCUMENTS

2009/0095005 A1\* 4/2009 Dietrich et al. ................ 62/244
2009/0320477 A1\* 12/2009 Juchymenko .................. 60/651

OTHER PUBLICATIONS

International Search Report for Application No. PCT/EP2011/054275 dated Apr. 12, 2011, 5 pages.

\* cited by examiner

HEATING, VENTILATION AND/OR AIR CONDITIONING LOOP AND HEATING, VENTILATION AND/OR AIR CONDITIONING EQUIPMENT INCLUDING SUCH HEATING, VENTILATION AND/OR AIR CONDITIONING LOOP

RELATED APPLICATIONS

This application is the National Stage of International Patent Application No. PCT/EP2011/054275, filed on Mar. 21, 2011, which claims priority to and all the advantages of French Patent Application No. FR 10/01171, filed on Mar. 24, 2010 and French Patent Application No. FR 10/03493, filed on Sep. 1, 2010.

The invention relates to the field of heating, ventilation and/or air conditioning installations of motor vehicles. More specifically, it relates to a heating, ventilation and/or air conditioning loop. It also relates to a heating, ventilation and/or air conditioning installation comprising a heating, ventilation and/or air conditioning loop of this type.

A motor vehicle, notably an electric or hybrid vehicle, is normally fitted with a heating, ventilation and/or air conditioning installation for modifying the ventilation and thermal parameters of an air flow distributed within the passenger compartment of the vehicle. For this purpose, the heating, ventilation and/or air conditioning installation comprises a heating, ventilation and/or air conditioning unit adapted to channel the flow of air before its distribution within the passenger compartment. The heating, ventilation and/or air conditioning unit is mainly composed of a housing made of plastic material accommodated under a dashboard of the vehicle.

In order to modify the temperature of the air flow before its diffusion into the passenger compartment, the heating, ventilation and/or air conditioning installation comprises a heating, ventilation and/or air conditioning loop within which a coolant flows.

This heating, ventilation and/or air conditioning loop comprises, notably, a compressor, an inner heat exchanger, a first expansion member associated with a first bypass valve, an external heat exchanger, a second expansion member and an evaporator, which are jointly associated with a second bypass valve, and an accumulator. The compressor is adapted to bring the coolant to a high pressure. The inner heat exchanger is contained in the housing to allow an exchange of heat between the coolant and the air flowing within the housing before its distribution in the passenger compartment. The first expansion member and the second expansion member are designed to expand the coolant from the high pressure to the low pressure. The external heat exchanger allows a heat transfer between the coolant and the ambient air, for example an air flow outside the vehicle. A heating, ventilation and/or air conditioning loop of this type is described, in particular, in the document U.S. Pat. No. 6,314,750.

The housing is fitted with flaps which are movable between a closed position in which the flaps prevent the air flow from passing through the inner heat exchanger, and an open position in which the flaps allow the air flow to pass through the inner heat exchanger.

The heating, ventilation and/or air conditioning loop is also able to operate in "cooling" mode in which the air flow is cooled by the evaporator, and in "heating" mode in which the air flow is heated by the inner heat exchanger. In "cooling" mode, the flaps are placed in the closed position in such a way that the air flow is not heated by the inner heat exchanger. In "heating" mode, the flaps are placed in the open position to allow the air flow to be heated during its passage through the inner heat exchanger.

However, this heating, ventilation and/or air conditioning loop is not designed to prevent the deposition of frost on an outer surface of the external heat exchanger. This frosting tends to reduce the speed of the outer air flow passing through the external heat exchanger, thus reducing the heat exchange between the coolant and the outer air flow. Such a reduction adversely affects the overall operation of the heating, ventilation and/or air conditioning loop and degrades the thermal performance of the loop.

Furthermore, if the external heat exchanger is largely or entirely covered in frost, this heating, ventilation and/or air conditioning loop will be unable to provide satisfactory thermal comfort within the passenger compartment.

Finally, in "cooling" mode, this heating, ventilation and/or air conditioning loop creates substantial pressure drops affecting the flow of the coolant during its passage through the inner heat exchanger, which tends to degrade the thermal performance of the heating, ventilation and/or air conditioning loop.

The object of the present invention is to propose a heating, ventilation and/or air conditioning loop whose architecture minimizes the pressure drops undergone by a coolant flowing within the heating, ventilation and/or air conditioning loop. Another object of the present invention is to propose a heating, ventilation and/or air conditioning installation comprising this heating, ventilation and/or air conditioning loop and allowing operation in different modes, notably the modes known as "heating", "cooling", and "demisting and/or drying", in an efficient and rapid manner, notably in extreme climatic conditions in which the heat exchanger may become substantially or even entirely covered with frost.

The heating, ventilation and/or air conditioning loop according to the present invention permits the flow of a coolant. According to the present invention, it comprises a compressor, an external heat exchanger, a residual heat exchanger and a first expansion member placed directly downstream of the residual heat exchanger according to a direction of flow of the coolant within the heating, ventilation and/or air conditioning loop.

The heating, ventilation and/or air conditioning loop comprises means of bypassing the residual heat exchanger and the first expansion member.

The bypass means are advantageously composed of a conduit comprising a coolant inlet point positioned in the heating, ventilation and/or air conditioning loop between the compressor and the residual heat exchanger and a coolant outlet point positioned in the heating, ventilation and/or air conditioning loop between the first expansion member and the external heat exchanger.

In a preferred variant, the conduit is provided with a straight-through valve adapted to allow or prevent a flow of coolant within the conduit.

In an alternative embodiment, the inlet point is provided with a three-way valve to send the coolant from the compressor toward the residual heat exchanger and/or the external heat exchanger through the conduit.

The heating, ventilation and/or air conditioning loop preferably comprises an accumulator positioned upstream of the compressor according to a direction of flow of the coolant within the heating, ventilation and/or air conditioning loop.

The heating, ventilation and/or air conditioning loop advantageously comprises an evaporator and a second expansion member. The heating, ventilation and/or air conditioning loop further comprises a bypass positioned in the heating, ventilation and/or air conditioning loop in parallel with the evaporator and the second expansion member.

In a first variant embodiment of the present invention, the residual heat exchanger is an intermediate heat exchanger through which the coolant and a heat transfer fluid flow. In this alternative embodiment, the intermediate heat exchanger is incorporated in a heat transfer fluid flow circuit including an internal heat exchanger through which an air flow can pass.

In a second variant embodiment of the present invention, the residual heat exchanger is an internal heat exchanger through which an air flow can pass.

The present invention also relates to a heating, ventilation and/or air conditioning installation comprising a heating, ventilation and/or air conditioning loop of this type.

The heating, ventilation and/or air conditioning installation comprises a heating, ventilation and/or air conditioning unit, advantageously housing the internal heat exchanger and/or an additional heating device.

Advantageously, the heating, ventilation and/or air conditioning installation also contains the evaporator, placed upstream of the internal heat exchanger and of the additional heating device, according to a direction of flow of internal air in the heating, ventilation and/or air conditioning unit.

In one embodiment, the evaporator, the internal heat exchanger and an additional heating device, such as an electric heating means, are positioned in succession within the heating, ventilation and/or air conditioning unit, the evaporator being placed upstream of the internal heat exchanger and of the additional heating device according to the direction of flow of the internal air flow within the heating, ventilation and/or air conditioning unit, the internal heat exchanger being placed upstream of the additional heating device according to the direction of flow of the internal air flow within the heating, ventilation and/or air conditioning unit.

More specifically, the heating, ventilation and/or air conditioning installation comprises the heating, ventilation and/or air conditioning loop as defined previously, which can exist in various configurations.

In what is known as a "heating" configuration, the heating, ventilation and/or air conditioning loop is configured in such a way that the coolant flows successively through the compressor, the residual heat exchanger, the first expansion member, the external heat exchanger, and the bypass, and returns to the compressor, preferably via an accumulator. The additional heating device is also active in this mode.

In what is known as a "cooling" configuration, the heating, ventilation and/or air conditioning loop is configured in such a way that the coolant flows successively through the compressor, the bypass means, the external heat exchanger, the second expansion member, and the evaporator, and returns to the compressor, preferably via an accumulator. The additional heating device is inactive in this mode.

In what is known as a "demisting and/or drying" configuration, the heating, ventilation and/or air conditioning loop is configured in such a way that the coolant flows successively through the compressor, the bypass means, the external heat exchanger, the second expansion member, and the evaporator, and returns to the compressor. The additional heating device is also active in this mode.

In what is known as a "drying with two expansion stages" configuration, the heating, ventilation and/or air conditioning loop is configured in such a way that the coolant flows successively through the compressor, the internal heat exchanger, the expansion member, the external heat exchanger, the second expansion member, and the evaporator, and returns to the compressor.

Figure 2:
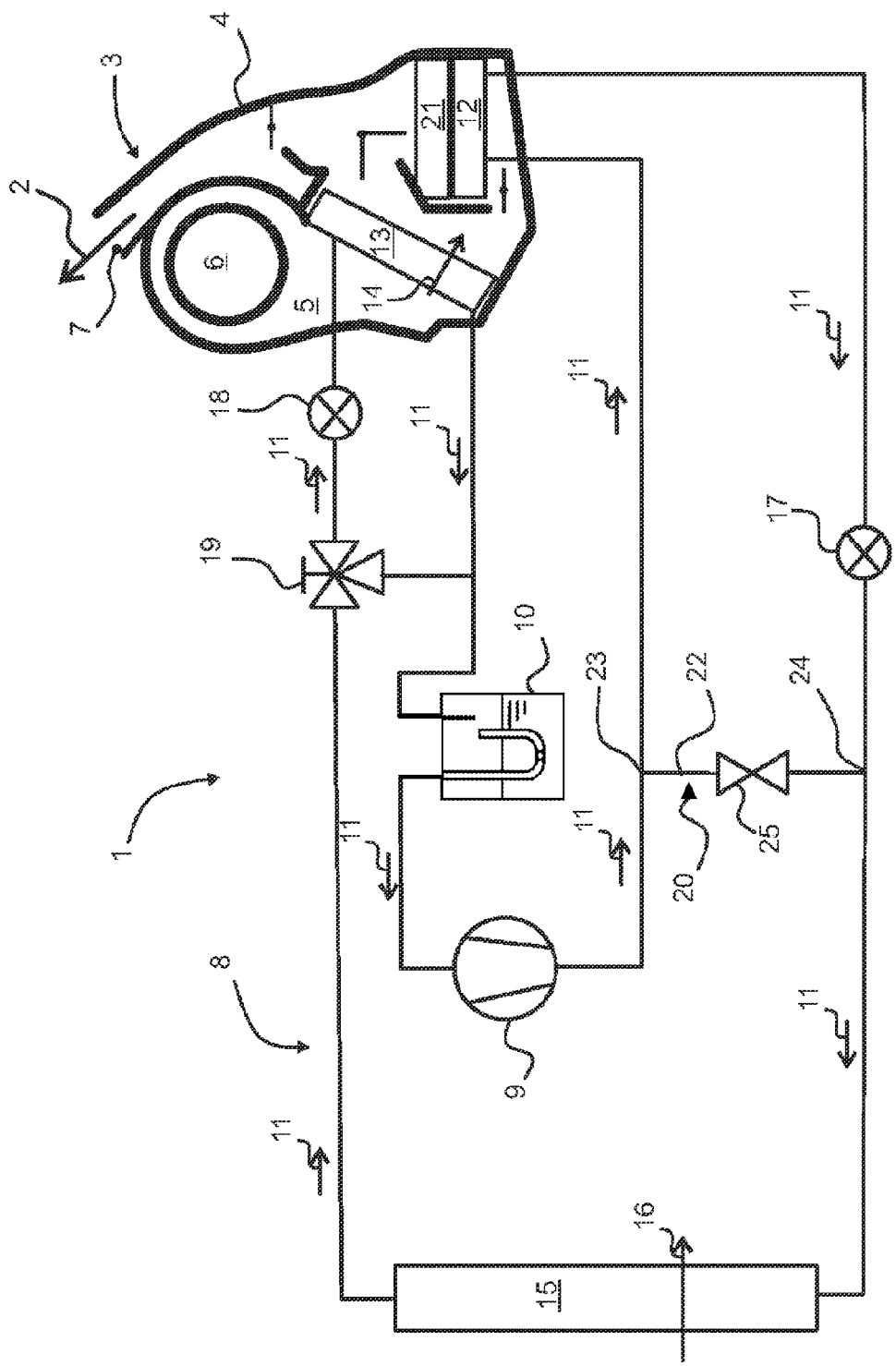

The present invention will be made more understandable and other characteristics and advantages will be made clear by an examination of the following detailed description which comprises examples of embodiment provided for illustrative purposes with reference to the attached drawings, provided by way of non-limiting example, which will aid in the comprehension of the present invention and the description of its embodiment and, if necessary, contribute to its definition, of which drawings FIG. 1 is a schematic view of a heating, ventilation and/or air conditioning installation according to the present invention, FIG. 2 is a schematic view of a variant embodiment of the heating, ventilation and/or air conditioning installation shown in FIG. 1, and FIGS. 3 to 5 are schematic views of the heating, ventilation and/or air conditioning installation shown in the preceding figure, in different operating modes.

Figure 6:
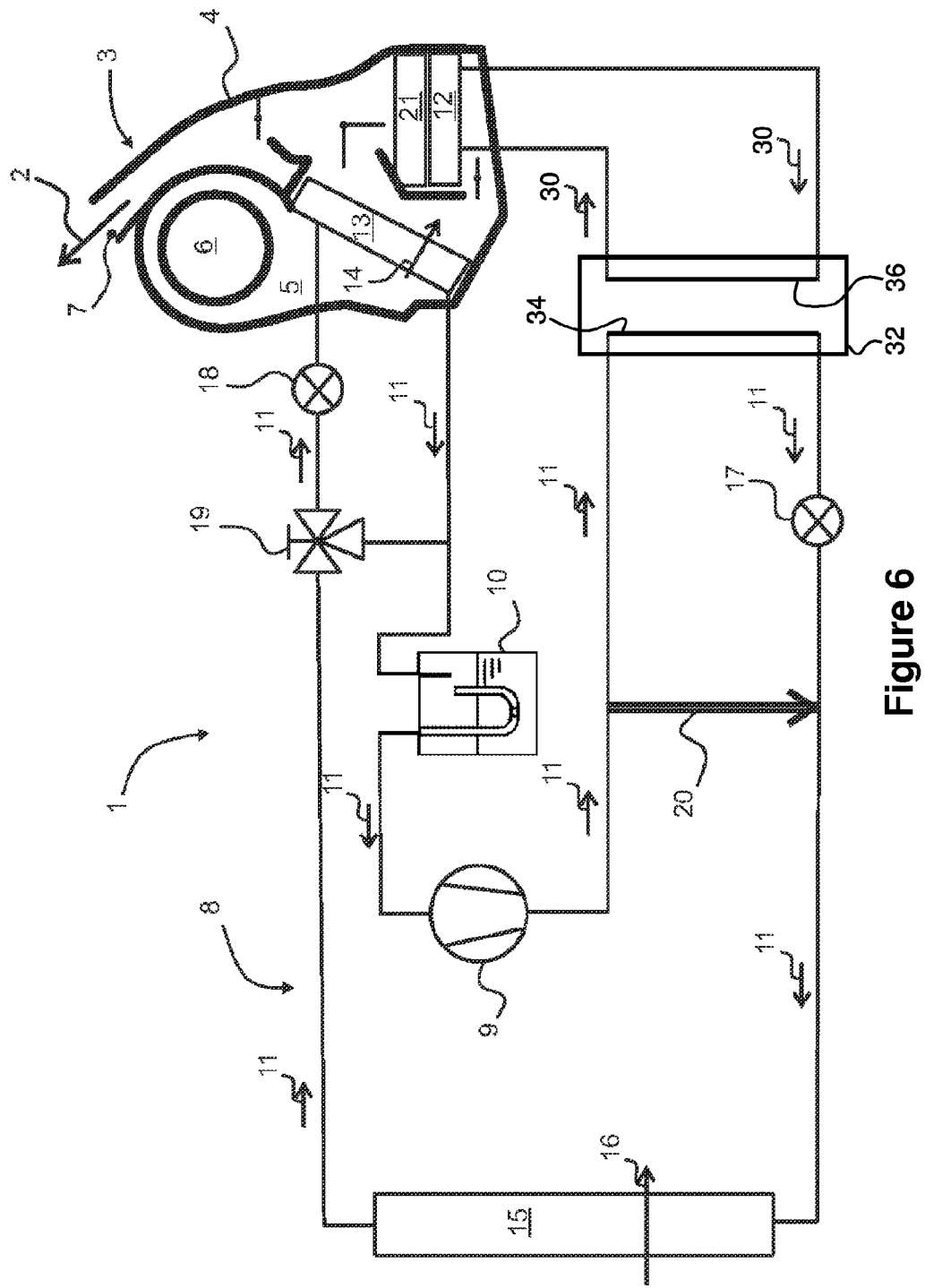

FIG. 6 is a schematic view of another variant embodiment of the heating, ventilation and/or air conditioning installation shown in FIG. 1.

FIGS. 1 to 5 show a heating, ventilation and/or air conditioning installation 1 for modifying the ventilation and thermal parameters of an air flow distributed within the passenger compartment of a motor vehicle, in particular an electric or hybrid vehicle. This modification is achieved by the distribution of an internal air flow 2 in the passenger compartment. The heating, ventilation and/or air conditioning installation 1 comprises a heating, ventilation and/or air conditioning unit 3 adapted to channel the flow of internal air 2 before its distribution within the passenger compartment.

The heating, ventilation and/or air conditioning unit 3 is mainly composed of a housing 4, notably made of plastic material, installed under a dashboard of the vehicle. The housing 4 contains a blower 5, for generating the internal air flow 2 from at least one air inlet aperture 6 toward at least one air distribution aperture 7, both apertures being positioned in the housing 4.

In order to modify a temperature of the internal air flow 2 before the diffusion of the latter into the passenger compartment, the heating, ventilation and/or air conditioning installation 1 comprises a heating, ventilation and/or air conditioning loop 8 within which there flows a coolant, such as a subcritical coolant, in particular a coolant of the type known under the trade names R134a or R1234yf or the like.

The heating, ventilation and/or air conditioning loop 8 comprises, in the direction of flow of the coolant, a compressor 9, adapted to bring the coolant to a high pressure. The compressor 9 is advantageously associated with an accumulator 10 to prevent the ingress of coolant in the liquid state into the compressor 9. For this purpose, the accumulator 10 is placed upstream of the compressor 9 according to a direction of flow 11 of the coolant within the heating, ventilation and/or air conditioning loop 8.

The heating, ventilation and/or air conditioning loop 8 comprises a residual heat exchanger adapted to permit a direct or indirect heat exchange between the internal air flow 2 and the coolant.

In a first variant embodiment, the residual heat exchanger is composed of an internal heat exchanger 12 contained in the housing 4 of the heating, ventilation and/or air conditioning unit 3. The internal heat exchanger 12 permits a heat transfer between the internal air flow 2 and the coolant.

The heating, ventilation and/or air conditioning loop 8 further comprises an evaporator 13 contained in the housing 4 of the heating, ventilation and/or air conditioning unit 3. The evaporator 13 also permits a heat transfer between the coolant and the internal air flow 2. More specifically, the evaporator 13 allows the internal air flow 2 to be cooled and dehumidified by the coolant during the passage of the internal air 2 through the evaporator 13.

Inside the housing 4, the evaporator 13 is placed upstream of the internal heat exchanger 12 according to a direction of flow 14 of the internal air flow 2 within the heating, ventilation and/or air conditioning unit 3.

The heating, ventilation and/or air conditioning loop 8 further comprises an external heat exchanger 15 which permits a heat transfer between the coolant and an ambient air flow 16, for example an air flow outside the vehicle. In order to facilitate this heat transfer, the external heat exchanger 15 is preferably positioned in the front of the vehicle, under the vehicle's engine hood.

The heating, ventilation and/or air conditioning loop 8 further comprises a first expansion member 17 and a second expansion member 18 which are adapted to expand the coolant from the high pressure to a low pressure.

The first expansion member 17 is placed in the heating, ventilation and/or air conditioning loop 8 directly downstream of the internal heat exchanger 12, according to the direction of flow 11 of the coolant within the heating, ventilation and/or air conditioning loop 8. The first expansion member 17 is preferably an electronically controlled expander such that the first expansion member 17 can prevent any passage of coolant through itself.

In a variant, the first expansion member 17 can be a calibrated orifice such as a tubular orifice or an electronically controlled expansion member associated with a valve which can allow or prevent the passage of coolant through the calibrated orifice.

A second expansion member 18 is positioned in the heating, ventilation and/or air conditioning loop 8 directly upstream of the evaporator 13, according to the direction of flow 11 of the coolant within the heating, ventilation and/or air conditioning loop 8.

The second expansion member 18 can equally well be a calibrated orifice such as a tubular orifice or an electronically controlled expansion member.

Finally, the heating, ventilation and/or air conditioning loop 8 comprises a bypass 19, for example a bypass formed by a bypass valve 19, the second expansion member 18 and the evaporator 13. The bypass 19 allows the coolant leaving the external heat exchanger 15 to flow either toward the second expansion member 18 and then to the evaporator 13, or toward the compressor 9, in particular via the accumulator 10.

In order to minimize, as far as possible, the pressure drop undergone by the coolant in the heating, ventilation and/or air conditioning loop 8, the present invention proposes that the heating, ventilation and/or air conditioning loop 8 be fitted with means 20 of bypassing the internal heat exchanger 12 and the first expansion member 17.

The bypass means 20 are adapted to cause the coolant leaving the compressor 9 to flow either directly toward the external heat exchanger 15 or directly toward the internal heat exchanger 12.

These arrangements are such that the heating, ventilation and/or air conditioning loop 8 has an architecture which is extremely simple but which enables it to operate, at least,
   in a "heating" mode in which the internal air flow 2 is heated, notably, by the internal heat exchanger 12,
   in a "cooling" mode in which the internal air flow 2 is cooled by the evaporator 13, and
   in a "defrosting" mode for defrosting the external heat exchanger 15.

The heating, ventilation and/or air conditioning loop 8 can also be capable of operating in a "drying" mode in which the internal air flow 2 is initially cooled by the evaporator 13, then heated by an additional heating device 21. For example, the additional heating device 21 comprises positive temperature coefficient resistances. The additional heating device 21 is contained in the housing 4, preferably downstream of the internal heat exchanger 12 according to a direction of flow 14 of the internal air flow 2 within the housing 4.

It is also feasible to define a "drying with two expansion stages" mode in which the internal air flow 2 is cooled and then heated. This mode is particularly advantageous in that the heat required to heat the internal air flow 2 is obtained without the need for power consumption by the supplementary compressor 9. This "drying with two expansions" mode therefore has an advantageous coefficient of performance.

Because of the additional heating device 21, it is possible in this case to provide the "defrosting" function as well, while maintaining comfort in the passenger compartment.

In the embodiment shown in FIGS. 2 to 5, the bypass means 20 comprise a conduit 22 comprising an inlet point 23 through which the coolant enters the conduit 22 and an outlet point 24 through which the coolant is discharged from the line 22. The inlet point 23 is placed in the heating, ventilation and/or air conditioning loop 8 between the compressor 9 and the internal heat exchanger 12, while the outlet point 24 is positioned in the heating, ventilation and/or air conditioning loop 8 between the second expansion member 17 and the external fluid heat exchanger 15.

In the variant embodiment shown in FIGS. 2 to 5, the conduit 22 is provided with a straight-through valve 25 adapted to prevent or allow a flow of the coolant within the conduit 22. In another variant embodiment which is not shown, the inlet point 23 is fitted with a three-way valve allowing the coolant to flow from the compressor 9 toward the external heat exchanger 15 through the internal heat exchanger 12 and the second expansion member 17, or directly through the conduit 22, or through the internal heat exchanger 12, the second expansion member 17 and the conduit 22.

Figure 3:
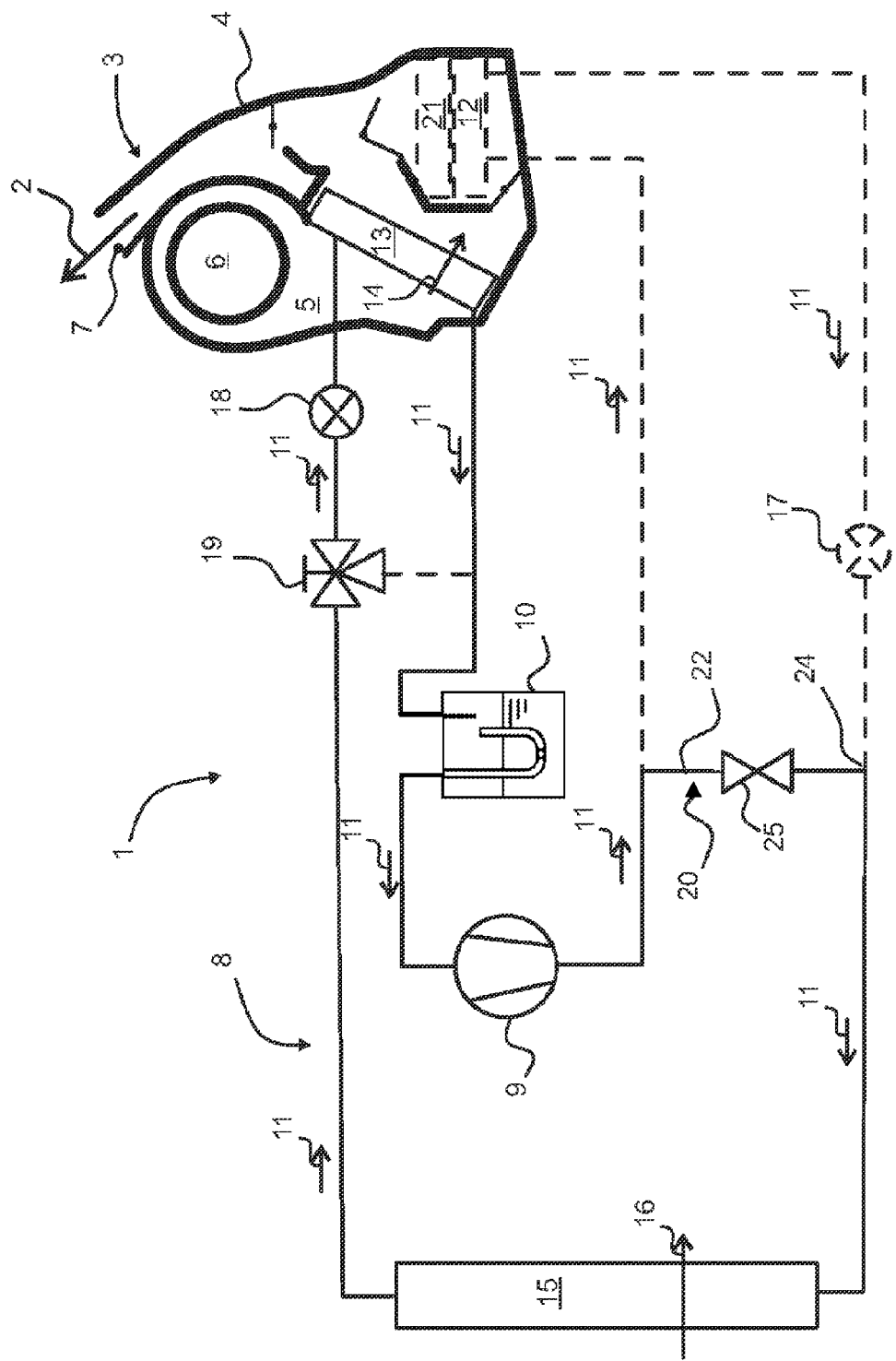

FIG. 3 shows a configuration of the heating, ventilation and/or air conditioning loop 8 in the "cooling" mode. In this configuration, the straight-through valve 25 is open to allow the coolant to pass through the conduit 22. Additionally, the bypass 19 allows the coolant to flow from the external heat exchanger 15 toward the second expansion member 18.

These arrangements are such that the coolant brought to high pressure by the compressor 9 enters the conduit 22 and flows through the straight-through valve 25, to reach the external heat exchanger 15.

Within the external heat exchanger 15, the coolant exchanges heat with the ambient air flow 16. In this configuration, the external heat exchanger 15 acts as a condenser. The coolant then leaves the external heat exchanger 15 and flows through the bypass 19 toward the second expansion member 18 within which the coolant undergoes expansion.

The coolant then flows toward the evaporator 13 within which it exchanges heat with the internal air flow 2.

Specifically, the internal air flow 2 is cooled during its passage through the evaporator 13 before it is distributed outside the housing 4. Advantageously, the internal heat exchanger 12 and the additional heating device 21 are inactive in this operating mode.

Finally, the coolant reaches the compressor 9 via the accumulator 10.

These arrangements are such that the coolant bypasses the internal heat exchanger 12 and the first expansion member 17, which tends to reduce the pressure drops which the coolant undergoes. This leads to an improvement in the overall thermal performance of the heating, ventilation and/or air conditioning loop 8, and notably an increase in a coefficient of performance COP of the heating, ventilation and/or air conditioning loop 8.

It has been found that the pressure drops are reduced by about 0.6 bar to 1.7 bar when the bypass means 20 are used, by comparison with architectures not including the bypass means 20.

In "cooling" mode, the coolant flow is zero or very low in the internal heat exchanger 12. Consequently the internal heat exchanger 12 is generally heated only to a small extent. Thus, in the present configuration, the heating of the internal air flow 2 is reduced by comparison with a conventional architecture in which the coolant flows constantly through the internal heat exchanger 12.

Figure 4:
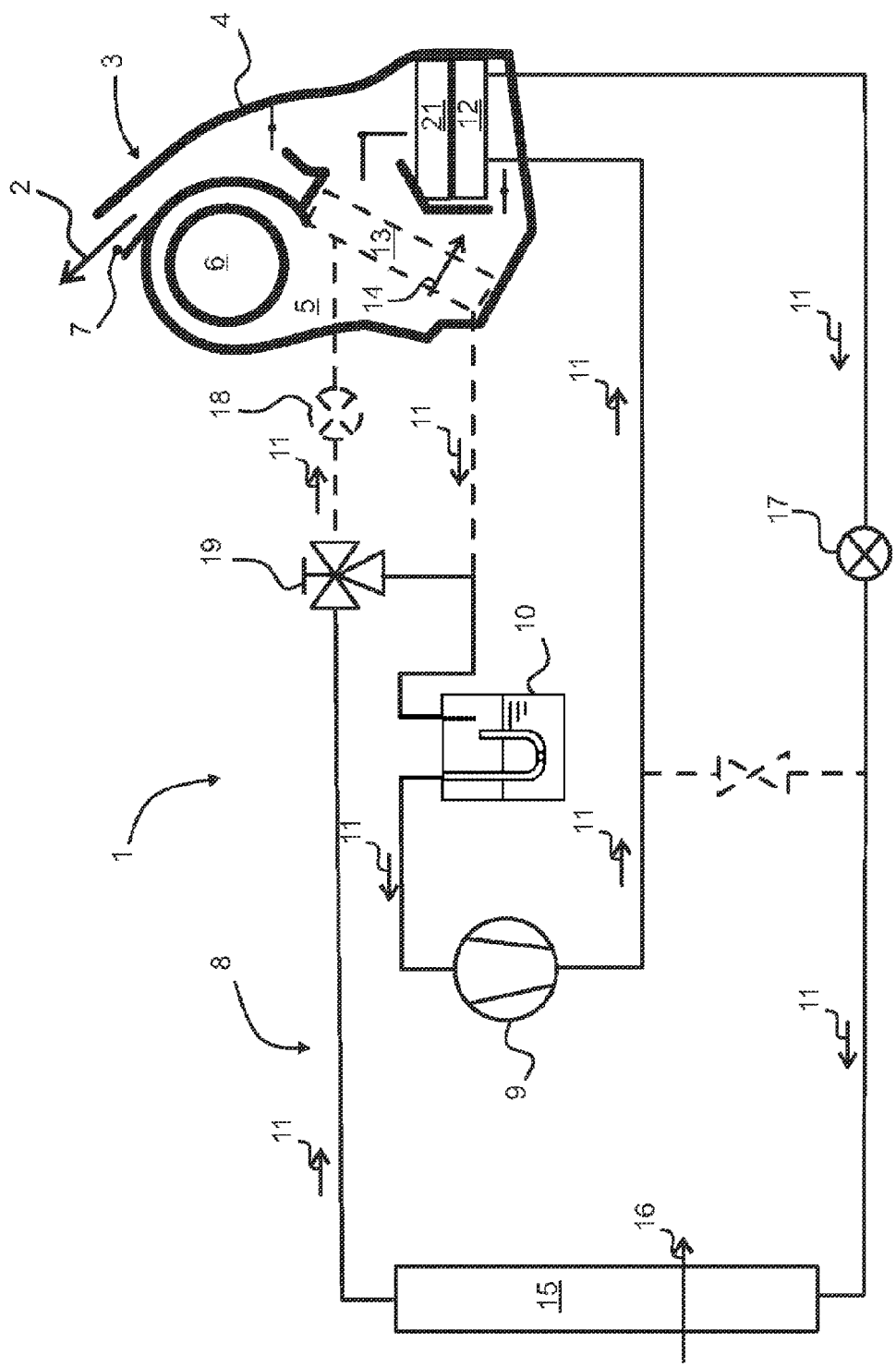

FIG. 4 shows a configuration of the heating, ventilation and/or air conditioning loop 8 in the "heating" mode. In this configuration, the straight-through valve 25 is closed to prevent the coolant from passing through the conduit 22. Additionally, the bypass 19 allows the coolant to flow from the external heat exchanger 15 toward the compressor 9, in particular via the accumulator 10. Advantageously, the additional heating device 21 is activated.

These arrangements are such that the coolant brought to high pressure by the compressor 9 flows toward the internal heat exchanger 12. In "heating" mode, the internal heat exchanger 12 operates as a condenser and thus allows the internal air flow 2 to be heated by the coolant while passing through the internal heat exchanger 12. Within the external heat exchanger 12, the coolant exchanges heat with the internal air flow 2. This causes the internal air flow 2 to be heated.

Preferably, but optionally, the heating of the internal air flow 2 by the internal heat exchanger 12 is supplemented by the heating of the internal air flow 2 provided by the additional heating device 21.

The coolant then flows toward the first expansion member 17 in which the coolant undergoes an expansion. The coolant then flows toward the external heat exchanger 15, which acts as an evaporator, thus cooling the ambient air flow 16 passing through it. The coolant then leaves the external heat exchanger 15 and flows through the bypass 19 toward the compressor 9, in particular via the accumulator 10.

Figure 5:
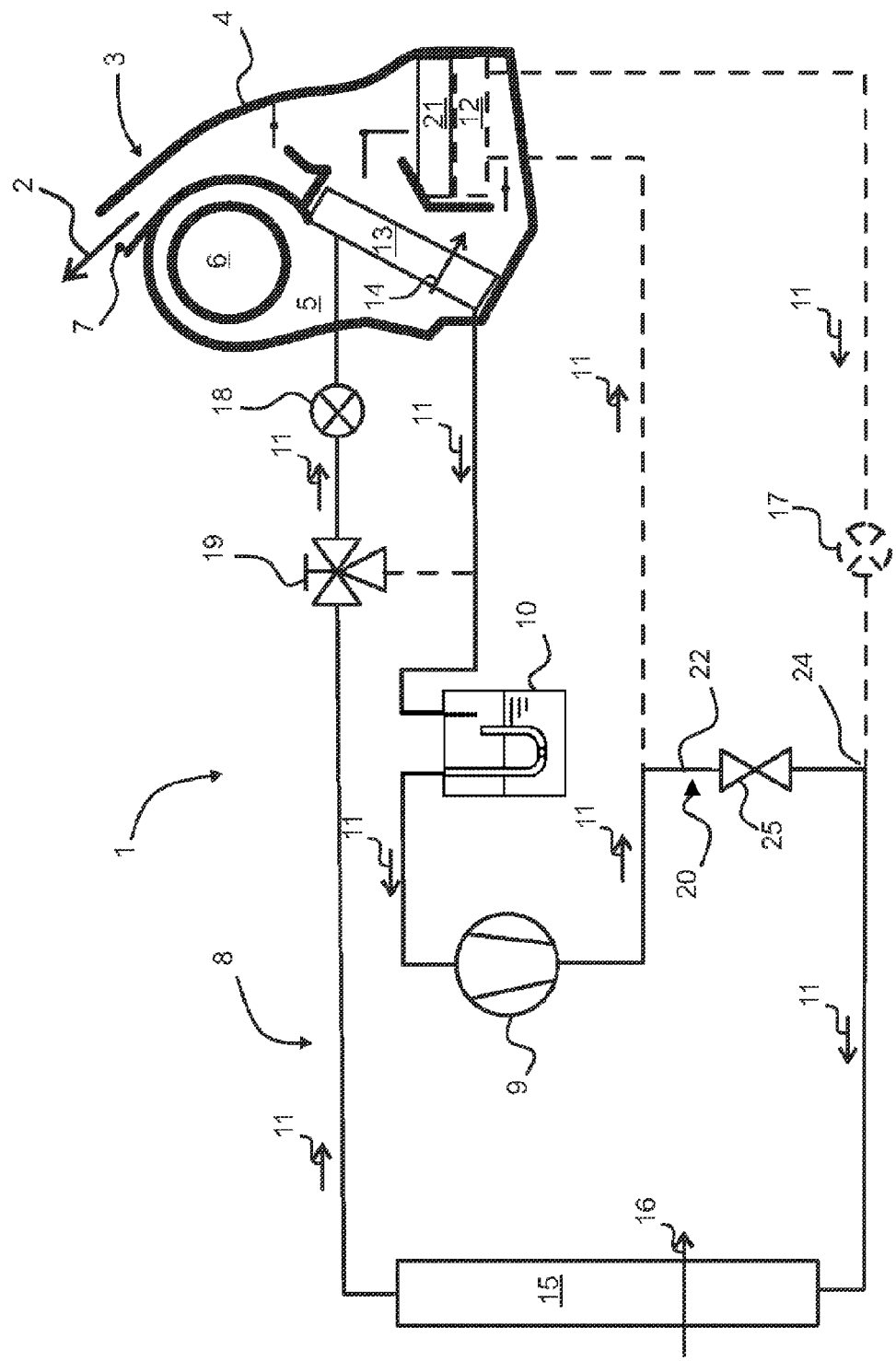

FIG. 5 shows a configuration of the heating, ventilation and/or air conditioning loop 8 in the "drying" or "demisting" mode. In this configuration, the straight-through valve 25 is open to allow the coolant to pass through the conduit 22. Additionally, the bypass 19 allows the coolant to flow from the external heat exchanger 15 toward the second expansion member 18. In this configuration, the additional heating device 21 is activated.

These arrangements are such that the coolant brought to high pressure by the compressor 9 flows toward the external heat exchanger 15. Within the external heat exchanger 15, the coolant exchanges heat with its environment, in particular the ambient air flow 16. This heat exchange advantageously defrosts the outer surface of the external heat exchanger 15. This frosting is prejudicial to the correct operation of the heating, ventilation and/or air conditioning loop 8, since the frost forms an obstacle to the passage of the ambient air flow 16 through the external heat exchanger 15.

The coolant then flows from the external heat exchanger 15 toward the second expansion member 18 within which it undergoes expansion. The coolant then flows within the evaporator 13 in such a way that the internal air flow 2 is cooled during its passage through the evaporator 13.

Finally, the coolant reaches the compressor 9, in particular via the accumulator 10.

The evaporator 13 is preferably located upstream of the additional heating device 21. In this embodiment, the additional heating device 21 is activated. Thus the internal air flow 2 is cooled during its passage through the evaporator 13 and is then heated by the additional heating device 21 before it is diffused outside the housing 4.

In addition to the cooling of the internal air flow 2, the evaporator 13 enables the internal air flow 2 to be dried by the condensation of the water vapor contained in the internal air flow 2 on an outer face of the evaporator 13.

These arrangements are such that the coolant bypasses the internal heat exchanger 12 and the first expansion member 17. An arrangement of this type tends to reduce the pressure drops which the coolant undergoes.

Furthermore, the fact that the internal heat exchanger 12 is inactive in the "drying" mode and in the "demisting" mode allows the internal heat exchanger 12 to be kept at a low temperature, typically in the range from 10° C. to 20° C.

Additionally, the defrosting provided by this arrangement is rapid and efficient because the energy produced by the compression of the coolant within the compressor 9 is immediately and directly returned by the external heat exchanger 15. This return provides rapid defrosting.

Finally, this architecture of the heating, ventilation and/or air conditioning loop 8 can be used, alternatively, to obviate the need to fit the internal heat exchanger 12 with flaps which can be moved between an open position in which the internal air flow 2 can pass through the internal heat exchanger 12, operating as a condenser 12, and a closed position in which this passage is prevented.

This ultimately results in a simplification of the heating, ventilation and/or air conditioning unit 3.

For example, the "demisting" mode is activated on the basis of the variation of the pressure of the coolant measured at the inlet of the compressor 9.

Alternatively, it is feasible to define a "drying in two expansion stages" mode which differs from the "drying" mode as defined in relation to FIG. 5. As detailed above, the heating, ventilation and/or air conditioning loop 8 can incorporate a first expansion member 17 and a second expansion member 18 of the electronically controlled expander type.

In this configuration, which is not shown, the straight-through valve 25 is closed to allow the coolant to pass, successively, into the internal heat exchanger 12 and the expansion member 17. The coolant is then sent toward the external heat exchanger 15, then toward the bypass 19. The latter allows the coolant to pass toward the expansion member 18 and then toward the evaporator 13. These arrangements are such that, ultimately, the internal air flow 2 is successively cooled and dried as it passes through the evaporator 13 and then heated as it passes through the internal heat exchanger 12, the mixing flap advantageously being in the "hottest" position. If necessary, the additional heating device 21 can be activated.

FIGS. 1 to 5 show a heating, ventilation and/or air conditioning installation 1 of the "direct" type. A heating, ventilation and/or air conditioning installation of the "direct" type is characterized in that the coolant passes through the internal heat exchanger 12.

Alternatively, the scope of the present invention also includes a heating, ventilation and/or air conditioning installation 1 of the "indirect" type. A heating, ventilation and/or air conditioning installation of the "indirect" type is characterized in that the coolant does not pass through the internal heat exchanger 12.

An example of a heating, ventilation and/or air conditioning installation 1 of the "indirect" type is shown in FIG. 6. This heating, ventilation and/or air conditioning installation 1 is distinguished from the arrangement described in relation to FIGS. 1 to 5 by the fact that the air conditioning loop 8 includes a residual heat exchanger formed by an intermediate heat exchanger 32.

The intermediate heat exchanger 32 is positioned between the bypass means 20 and the internal heat exchanger 12. It provides a condenser function. Thus the coolant flowing in a first part of the air conditioning loop 8 in the direction identified by the reference 11 in FIG. 6 passes through the intermediate heat exchanger 32.

The intermediate heat exchanger 32 also permits an exchange of heat between the coolant and the internal heat exchanger 12. This is because the intermediate heat exchanger 32 permits an exchange of heat between the coolant flowing in the first part of the air conditioning loop 8 and a heat transfer fluid flowing in a second part of the air conditioning loop 8. The second part of the air conditioning loop 8 includes the intermediate heat exchanger 32 and the internal heat exchanger 12.

The intermediate heat exchanger 32 includes a first heat exchange surface 34 over which the coolant passes and a second heat exchange surface 36 over which the heat transfer fluid passes. This arrangement provides an exchange of heat between the coolant and the heat transfer fluid.

The second part of the air conditioning loop 8 can also include means for creating a flow of heat transfer fluid, such as, notably, a pump.

The direction of flow 30 of the heat transfer fluid flowing in the second part of the air conditioning loop 8 permits a transfer of heat between the intermediate heat exchanger 32 and the internal heat exchanger 12.

As it passes through the intermediate heat exchanger 32, the coolant exchanges heat with the heat transfer fluid. The latter then passes through the internal heat exchanger 12. The internal heat exchanger 12 is adapted to permit a heat transfer between the internal air flow 2 and the coolant.

The arrangement of the heating, ventilation and/or air conditioning installation 1 in a configuration of the "indirect" type shown in FIG. 6 does not alter the various operating modes of the air conditioning loop 8 (the "heating", "cooling", "defrosting", "drying", "drying in two expansion stages", and any other modes).

Thus the various configurations described with reference to FIGS. 1 to 5, for a "direct" architecture, are equally applicable to an "indirect" architecture as described in FIG. 6.

The effect of all these arrangements is such that the time required to defrost the external heat exchanger 15 is shorter, notably two times shorter, with the use of the bypass means 20, than if an architecture without these bypass means 20 is used. This reduction in defrosting time is essentially due to the fact that the coolant entering the external heat exchanger 15 is much hotter when the bypass means 20 are used. The difference is typically about 30° C. when the coolant short-circuits the internal heat exchanger 12 by flowing through the bypass means 20.

Finally, it should be noted that different applications are possible according to the principles of the invention. However, it is to be understood that these examples of operation are provided by way of illustration of the purpose of the invention. Clearly, the invention is not limited to the embodiments which are described above and which are provided solely by way of example. It incorporates various modifications, alternative forms and other variants which could be devised by a person skilled in the art in the context of the present invention, and notably all combinations of the various embodiments described above.

Furthermore, the various embodiments described above can be used separately or in combination in order to provide alternative embodiments and different configurations of a heating, ventilation and/or air conditioning installation as defined according to the present invention.

The invention claimed is:

1. A heating, ventilation and/or air conditioning loop (8) within which a coolant flows, comprising a compressor (9), an external heat exchanger (15), a residual heat exchanger (12, 32) and a first expansion member (17) placed downstream of the residual heat exchanger (12, 32) according to a direction of flow (11) of the coolant within the heating, ventilation and/or air conditioning loop (8), wherein the heating, ventilation and/or air conditioning loop (8) comprises means (20) of bypassing the residual heat exchanger (12, 32) and the first expansion member (17) extending between the direction of flow (11) of the coolant from the compressor (9) to the residual heat exchanger (12, 32) and between the first expansion member (17) and the external heat exchanger (15).

2. A heating, ventilation and/or air conditioning loop (8), within which a coolant flows, comprising a compressor (9), an external heat exchanger (15), a residual heat exchanger (12, 32) and a first expansion member (17) placed downstream of the residual heat exchanger (12, 32) according to a direction of flow (11) of the coolant within the heating, ventilation and/or air conditioning loop (8), wherein the heating, ventilation and/or air conditioning loop (8) comprises means (20) of bypassing the residual heat exchanger (12, 32) and the first expansion member (17); and wherein the bypass means (20) are composed of a conduit (22) comprising a coolant inlet point (23) positioned in the heating, ventilation and/or air conditioning loop (8) between the compressor (9) and the residual heat exchanger (12, 32), and a coolant outlet point (24) positioned in the heating, ventilation and/or air conditioning loop (8) between the first expansion member (17) and the external heat exchanger (15).

3. The heating, ventilation and/or air conditioning loop (8) as claimed in claim 2, wherein the conduit (22) is provided with a straight-through valve (25) adapted to allow or prevent a flow of coolant within the conduit (22).

4. The heating, ventilation and/or air conditioning loop (8) as claimed in claim 2, wherein the inlet point (23) is provided with a three-way valve adapted to allow the coolant to flow from the compressor (9) toward the internal residual heat exchanger (12, 32) and/or toward the external heat exchanger (15) via the conduit (22).

5. The heating, ventilation and/or air conditioning loop (8) as claimed in claim 1, wherein the heating, ventilation and/or air conditioning loop (8) comprises an accumulator (10) positioned upstream of the compressor (9) according to the direction of flow (11) of the coolant within the heating, ventilation and/or air conditioning loop (8).

6. The heating, ventilation and/or air conditioning loop (8) as claimed in claim 1, wherein the heating, ventilation and/or air conditioning loop (8) comprises an evaporator (13) and a second expansion member (18) positioned upstream of the compressor (9) according to the direction of flow (11) of the coolant within the heating, ventilation and/or air conditioning loop (8).

7. The heating, ventilation and/or air conditioning loop (8) as claimed in claim 6, wherein the heating, ventilation and/or air conditioning loop (8) comprises a bypass (19) positioned in the heating, ventilation and/or air conditioning loop (8) in parallel with the evaporator (13) and the second expansion member (18).

8. The heating, ventilation and/or air conditioning loop (8) as claimed in claim 1, wherein the residual heat exchanger is an intermediate heat exchanger (32) through which the coolant and a heat transfer fluid flow.

9. The heating, ventilation and/or air conditioning loop (8) as claimed in claim 8, wherein the intermediate heat exchanger (32) is incorporated in a heat transfer fluid flow circuit including an internal heat exchanger (12) through which an air flow can pass.

10. The heating, ventilation and/or air conditioning loop (8) as claimed in claim 1, wherein the residual heat exchanger is an internal heat exchanger (12) through which an air flow can pass.

11. A heating, ventilation and/or air conditioning installation (1) comprising a heating, ventilation and/or air conditioning loop (8) within which a coolant flows, comprising a compressor (9), an external heat exchanger (15), a residual heat exchanger (12, 32) and a first expansion member (17) placed downstream of the residual heat exchanger (12, 32) according to a direction of flow (11) of the coolant within the heating, ventilation and/or air conditioning loop (8), wherein the heating, ventilation and/or air conditioning loop (8) comprises means (20) of bypassing the residual heat exchanger (12, 32) and the first expansion member (17) extending between the direction of flow (11) of the coolant from the compressor (9) to the residual heat exchanger (12, 32) and between the first expansion member (17) and the external heat exchanger (15).

12. The heating, ventilation and/or air conditioning installation (1) as claimed in claim 11, wherein the heating, ventilation and/or air conditioning installation (1) comprises a heating, ventilation and/or air conditioning unit (3) housing the internal heat exchanger (12) and/or an additional heating device (21).

13. The heating, ventilation and/or air conditioning installation (1) as claimed in claim 11, wherein the heating, ventilation and/or air conditioning loop (8) comprises an evaporator (13) and a second expansion member (18) positioned upstream of the compressor (9) according to the direction of flow (11) of the coolant within the heating, ventilation and/or air conditioning loop (8), and wherein the heating, ventilation and/or air conditioning loop (8) is configured in what is known as a "heating" mode in which the coolant flows successively through the compressor (9), the residual heat exchanger (12, 32), the first expansion member (17), and the external heat exchanger (15), and returns to the compressor (9).

14. The heating, ventilation and/or air conditioning installation (1) as claimed in claim 11, wherein the heating, ventilation and/or air conditioning loop (8) the heating, ventilation and/or air conditioning loop (8) is configured in what is known as a "cooling" mode in which the coolant flows successively through the compressor (9), the bypass means (20), the external heat exchanger (15), the second expansion member (18), and the evaporator (13), and returns to the compressor (9).

15. The heating, ventilation and/or air conditioning installation (1) as claimed in claim 11, wherein the heating, ventilation and/or air conditioning loop (8) comprises an evaporator (13) and a second expansion member (18) positioned upstream of the compressor (9) according to the direction of flow (11) of the coolant within the heating, ventilation, and/or air conditioning loop (8), and wherein the heating, ventilation and/or air conditioning loop (8) is configured in what is known as a "demisting and/or drying" mode in which the coolant flows successively through the compressor (9), the bypass means (20), the external heat exchanger (15), the second expansion member (18), and the evaporator (13), and returns to the compressor (9).

16. The heating, ventilation and/or air conditioning loop (8) as claimed in claim 3, wherein the inlet point (23) is provided with a three-way valve adapted to allow the coolant to flow from the compressor (9) toward the internal residual heat exchanger (12, 32) and/or toward the external heat exchanger (15) via the conduit (22).

17. The heating, ventilation and/or air conditioning installation (1) as claimed in claim 11, wherein the heating, ventilation and/or air conditioning installation (1) comprises a heating, ventilation and/or air conditioning unit (3) housing the internal heat exchanger (12) and/or an additional heating device (21).

\* \* \* \* \*